(12) United States Patent
Ladkani et al.

(10) Patent No.: US 11,137,994 B2
(45) Date of Patent: Oct. 5, 2021

(54) BASEBOARD MANAGEMENT CONTROLLER FIRMWARE UPDATE

(71) Applicant: Microsoft Technology Licensing, LLC, Redmond, WA (US)

(72) Inventors: Neeraj Ladkani, Redmond, WA (US); Viswanathan Swaminathan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/678,665

(22) Filed: Nov. 8, 2019

(65) Prior Publication Data
US 2021/0141626 A1 May 13, 2021

(51) Int. Cl.
*G06F 8/65* (2018.01)
*G06F 3/06* (2006.01)
*G06F 13/42* (2006.01)

(52) U.S. Cl.
CPC .............. *G06F 8/65* (2013.01); *G06F 3/0604* (2013.01); *G06F 3/0655* (2013.01); *G06F 3/0676* (2013.01); *G06F 13/4282* (2013.01); *G06F 2213/0042* (2013.01)

(58) Field of Classification Search
USPC ........................................................ 717/168
See application file for complete search history.

(56) References Cited

U.S. PATENT DOCUMENTS 7,849,454 B2 12/2010 Lambert et al.
8,428,929 B2 4/2013 Sakthikumar et al.
9,043,777 B2 5/2015 Guo et al.
9,910,664 B2 3/2018 Christopher et al.
10,346,187 B1 7/2019 Trier et al.
10,409,584 B1* 9/2019 Kulchytskyy .......... G06F 21/572
10,452,386 B1* 10/2019 Kulchytskyy ......... G06F 16/245
(Continued)

FOREIGN PATENT DOCUMENTS

CN 104182261 A 12/2014
WO 2017048291 A1 3/2017

OTHER PUBLICATIONS

"SSH File Transfer Protocol"; Wikipedia.org website; Sep. 23, 2019 (Year: 2019).*
(Continued)

*Primary Examiner* — Qing Chen
*Assistant Examiner* — Clint Thatcher
(74) *Attorney, Agent, or Firm* — Ray Quinney & Nebeker; Thomas M. Hardman; Bo Niu

(57) ABSTRACT

A baseboard management controller (BMC) may comprise a processor, a non-volatile memory and a volatile memory. The non-volatile memory comprises firmware categorized into a plurality of independently updatable service modules. Each of the independently updatable service modules is stored on a read-write partition of the non-volatile memory and comprises at least one of an application, a library and a driver. The BMC comprises an update agent that performs an update process. In the update process, a BMC update package, which comprises an update service module for updating an existing service module stored in one of the plurality of RW partitions, is stored in the volatile memory. The existing service module stored in the RW partition is replaced with the update service module.

18 Claims, 5 Drawing Sheets

(56) References Cited

U.S. PATENT DOCUMENTS

| | | | |
|---|---|---|---|
| 10,846,113 B1* | 11/2020 | Trier | G06F 9/546 |
| 2008/0077711 A1* | 3/2008 | Cepulis | G06F 9/4406 |
| | | | 709/250 |
| 2014/0337004 A1 | 11/2014 | Maity et al. | |
| 2015/0242357 A1* | 8/2015 | Pancholi | G06F 12/0238 |
| | | | 710/13 |
| 2016/0328229 A1 | 11/2016 | Christopher et al. | |
| 2018/0173516 A1* | 6/2018 | Tung | G06F 8/63 |
| 2020/0142683 A1* | 5/2020 | Rao | G06F 9/4411 |

OTHER PUBLICATIONS

"Updating BMC Firmware Nondisruptively", Retrieved from: https://documents.uow.edu.au/~blane/netapp/ontap/upgrade/upgrading/task/t_oc_upg_fw-bmc-update-nondis.html, Jul. 29, 2019, 2 Pages.

"Upgrading the BMC and BIOS Firmware", Retrieved from: https://support.sonus.net/display/SBXDOC60/Upgrading+the+BMC+and+Bios+Firmware, Jul. 29, 2019, 3 Pages.

"International Search Report and Written Opinion Issued in PCT Application No. PCT/US20/058077", dated Apr. 9, 2021, 16 Pages.

\* cited by examiner

BASEBOARD MANAGEMENT CONTROLLER FIRMWARE UPDATE

FIELD

The present disclosure relates generally to baseboard management controller (BMC) technology, and more particularly, to firmware update for a BMC.

BACKGROUND

Data centers are used all over the world to provide massive amounts of processing and storage capacity. Data centers typically include multiple racks of servers, sometimes referred to as "blades." These blades each include one or more processors and memory. A baseboard management controller (BMC) is generally an embedded control device that serves as an interface between system management software and platform hardware. The BMC monitors server operating parameters such as temperature, cooling fan speed, power status, operating system status, etc. The BMC interfaces with other blade components (including hardware and Software components such as a chassis management interface) according to the Intelligent Platform Management Interface (IPMI).

The firmware of a BMC includes a boot loader, a kernel, configuration data, and a root file system stored on partitions in a flash drive (e.g., a serial peripheral interface (SPI) flash drive) of the BMC. These partitions together constitute a BMC binary ROM image. The BMC's firmware may need to be updated from time to time to address issues relating to various functions of the BMC. When updating the BMC's firmware, the firmware is treated as a binary blob, and the entire BMC binary ROM image is written to the flash memory of the BMC in an update.

BRIEF SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Accordingly to one implementation of the present disclosure, a system comprises a baseboard management controller (BMC). The BMC may comprise a processor and memory. The memory may include a non-volatile memory and a volatile memory. The non-volatile memory may comprise firmware categorized into a plurality of independently updatable service modules, each of the independently updatable storage modules being stored on a read-write (RW) partition of the non-volatile memory. Each of the independently updatable service modules may comprise at least one of an application, a library, and a driver. The memory may further comprise executable code that, when executed at the processor, is configured to perform a firmware update. The firmware update may include: receive a BMC update package for updating an existing service module stored in one of the plurality of RW partitions, where the BMC update package comprises an update service module; store the BMC update package in the volatile memory; and replace the existing service module stored in the RW partition of the non-volatile memory with the update service module.

According to another implementation of the present disclosure, a method of updating firmware of a BMC comprises: receiving a BMC update package comprising an update service module for updating an existing service module of the BMC, the service module being stored in one of a plurality of read-write (RW) partitions of a non-volatile memory of the BMC, each RW partition comprising an independently updatable service module, wherein each of the independently updatable service modules comprises at least one of an application, a library, and a driver; storing the BMC update package in a volatile memory of the BMC; replacing the existing service module stored in the RW partition of the non-volatile memory with the update service module; and restarting a service of the BMC associated with the update service module.

According to another implementation of the present disclosure, a method for transferring files to a baseboard management controller (BMC) comprises: receiving a command from a deployment agent instructing the BMC to enter into transfer mode; identifying a partition of volatile memory of the BMC and mounting the partition of the volatile memory to a host computing device connected to the BMC through a memory interface as a virtual memory drive; transferring a file from a host computing device to the BMC by storing the file in the volatile memory by way of a write operation to the virtual memory drive; and unmounting the partition of the volatile memory from the host computing device.

BRIEF DESCRIPTION OF THE FIGURES (NON-LIMITING EMBODIMENTS OF THE DISCLOSURE)

Various embodiments in accordance with the present disclosure will be described with reference to the drawings, in which.

DETAILED DESCRIPTION

Figure 1:
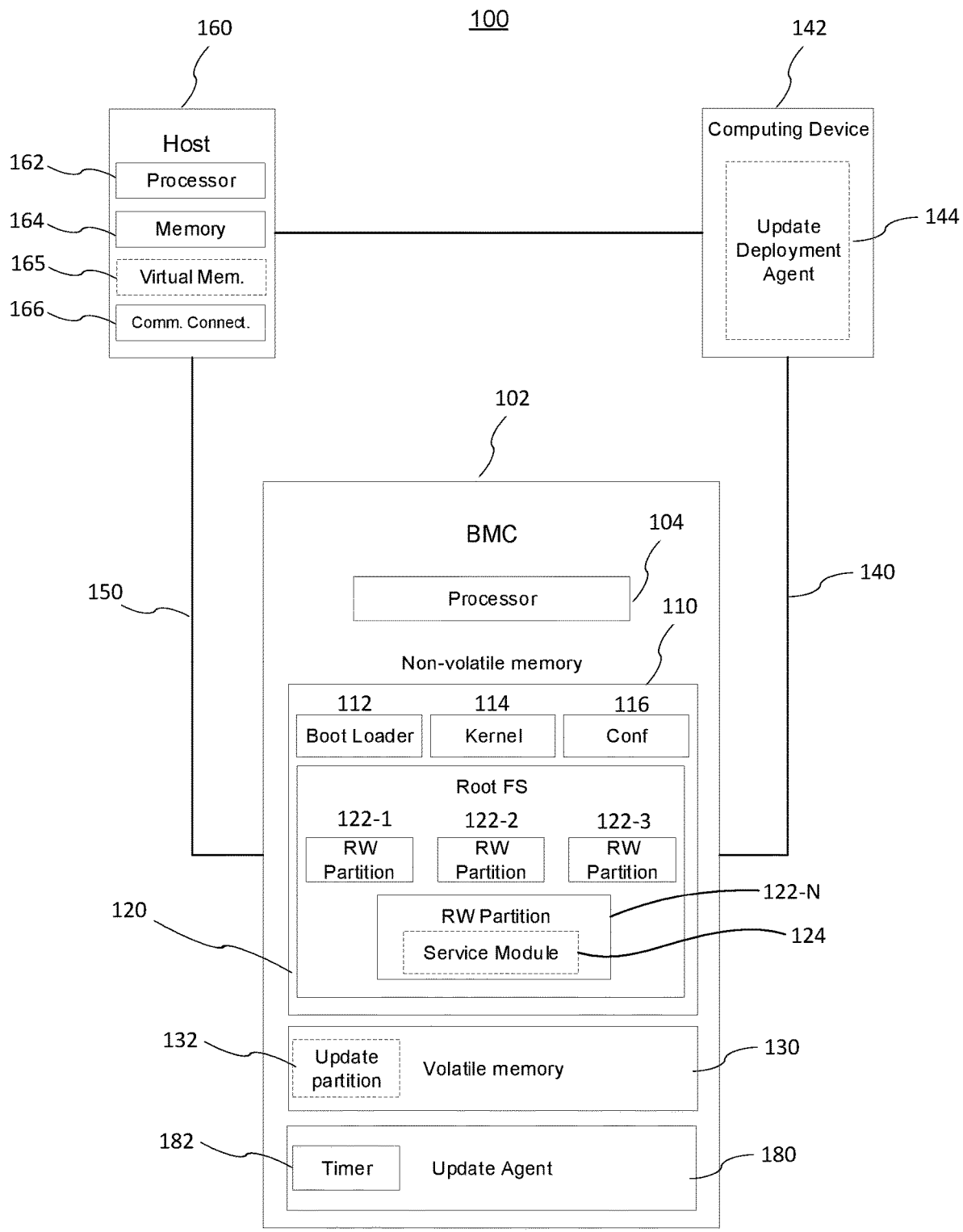
FIG. 1 is a schematic view of a computing system for updating a firmware of a BMC, in accordance with an example implementation of the present disclosure.

In the following detailed description, reference is made to the accompanying drawings which form a part hereof, and in which are shown by way of illustration specific embodiments. These embodiments are described in sufficient detail to enable those skilled in the art to practice the technology, and it is to be understood that other embodiments may be utilized and that structural, logical and electrical changes may be made without departing from the spirit and scope of the disclosure. The following detailed description is therefore not to be taken in a limiting sense, and the scope is defined only by the appended claims and equivalents thereof. Like numbers in the figures refer to like components, which should be apparent from the context of use.

Various implementations of the present disclosure describe techniques for updating firmware of a BMC and transferring data between the BMC and a host computing device. The present subject matter describes a service-based update of a BMC in which the firmware of the BMC is partitioned into individually updatable service modules, allowing the BMC to be updated without having to rewrite an entire BMC blob image. For the purposes of explanation and not as a limitation, a service module is the origin of a service provided by the BMC and may include an individual BMC service or application (e.g., fan management service/application), drivers, and/or the library associated with the individual service or application.

As mentioned above, the BMC's firmware includes a boot loader, a kernel, configuration data, and a root file system. The root file system is stored in a read-only partition of the BMC's non-volatile memory (e.g., SPI flash drive). The root file system of the BMC includes a plurality of executable applications and their libraries. When the BMC's firmware is treated as a monolithic binary blob, an update needed for a particular service provided by the firmware requires updating the entire firmware. For example, an update to the configuration of the BMC's firmware necessitates an update of the entire BMC firmware image, including each of the applications/services of the root file system.

Furthermore, an update to the entire BMC firmware requires a full BMC reboot/restart. This creates issues with respect to availability. For example, when the BMC resets, the BMC's critical functionality is not available for fabric management. Thus, if the network fabric to which the BMC is connected is monitoring BMC health status, and the BMC is not available because of an update or reset, the network fabric may determine that the BMC is unavailable and may put the hardware into an unhealthy state, further impacting availability.

In an aspect of the present subject matter, BMC availability is increased during a BMC update by dividing a non-volatile memory of the BMC into a plurality of read-write (RW) partitions that include independently updatable service modules. For example, the services provided by the root file system of the BMC may be categorized into individual service modules each stored on a different RW partition. The different service modules may each include an individual application, a grouping of applications, an application's libraries, an application and its libraries, etc. Having a plurality of RW partitions for different service modules allows independent updates to the services that the BMC provides. Thus, an entire restart of the BMC is not necessary, and system availability is increased.

In another aspect of the present subject matter, BMC availability may be increased by providing a high bandwidth protocol and a high bandwidth interface from a host computing device to the BMC to update BMC services. To do so, the BMC may mount a portion of its own volatile memory onto the host computing device as a virtual memory drive in order to transfer data at the native speed of the host computing device's memory drive, thus allowing data transfer of an update package to be completed in a shorter duration of time.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

FIG. 1 illustrates a schematic of a computing system 100 for updating firmware of a BMC, in accordance with an example implementation of the present subject matter. Referring to FIG. 1, the computing system 100 comprises a BMC 102 and a host computing device 160. The BMC 102 is connected to the host computing device 160 via a high speed in-band interface 150 such as a universal serial bus (USB) interface. In addition, the BMC may be connected to an out-of-band network, such as a trusted LAN network in which the out-of-band nature of management traffic is ensured, via out-of-bound interface 140 (e.g., Intelligent Platform Management Interface/IPMI, Redfish Host Interface). In exemplary implementations, the BMC 102 may be further connected to computing device 142 through the in-band interface 150 and/or out-of-band interface 140. Computing device 142 may be a remote server providing services for updating the BMC 102.

The host computing device 160 may be a general purpose computer or a headless computer. Host computing device 160 may include a processor 162, a memory 164 and communications connections 166. The processor 162, memory 164 and communications connections 166 may reside on a motherboard of the host computing device. In certain implementations, the BMC 102 may also be incorporated onto the motherboard of the host computing device 160.

The memory 164 of the host computing device 160 may store machine readable instructions that the processor 162 may execute. The memory 164 may include a plurality of software applications including a host operating system (OS). The processor 162 is a host processor configured to control the operation of the host computing device 162.

The BMC 102 is a specialized microcontroller that manages the interface between system management software and platform hardware. Different types of sensors may be built into the computer system 100, and the BMC 102 reads these sensors to obtain parameters such as temperature, cooling fan speeds, power status, operating system (OS) status, etc. BMC 102 monitors and manages components of server hardware. Thus, it is preferable for the BMC's services to be available during the entire time the server is powered up.

The BMC 102 comprises a processor 104, non-volatile memory 110, volatile memory 130, and update agent 180. The processor 104 controls the operations of the BMC 102. The processor 104 may execute firmware, such as boot loader 112, kernel 114, configuration 116 and root file system 120, or other code stored in the BMC 102. The processor 104 may also execute the update agent 180 for updating the firmware of the BMC. The update agent 180 may be machine readable code stored on the BMC's memory, such as the nonvolatile memory 110 and/or the volatile memory 130, for performing an update of the firmware of the BMC 102.

The volatile memory 130 is configured to store the data and information during the operation of the BMC 102. In certain implementations of the present disclosure, the volatile memory 130 may include an update partition 132 used to perform an update of the firmware of the BMC 102, which is described in more detail below. The volatile memory 130 may be random access memory (RAM).

The non-volatile memory 110 is a non-volatile data storage media for storing computer executable code and data required for the operation of the BMC 102. The computer executable code and data may include firmware of the BMC 102, such as boot loader 112, kernel 114, configuration 116 and root file system 120, and other necessary firmware or software components of the BMC 102. Examples of nonvolatile memory may include flash memory (e.g., a serial peripheral interface (SPI) flash drive), USB drives, hard drives, or any other type of data storage device.

The boot loader 112 is a computer program that loads the kernel 114 of the BMC 102. The boot loader 112 is loaded onto the volatile memory 130 from the non-volatile memory 110 and performs processes for booting up the BMC 102, such as bringing the kernel 114 from the non-volatile memory 110 to the volatile memory 130 and providing the kernel 114 with information needed to operate. The boot loader 112 may then transfer control to the kernel 114.

The kernel 114 is the operating system (OS) for the BMC. The kernel 114 manages I/O requests from software, and translates the requests into data processing instructions for the processor 104. The kernel 114 mediates access to the BMC's 102 resources, including the processor 104, non-volatile memory 110 and volatile memory 130.

The configuration data 116 includes information and data that enables the BMC 102 to operate. The configuration data 116 may include the media access control (MAC) address of the BMC 102, kernel boot parameters, environmental variables and other user specific files. The MAC address provides internet protocol (IP) information available for the BMC 102, which allows network connectivity and network support of the BMC 102 to perform remote management. The kernel boot parameters and environmental variables allow the BMC 102 to properly run the kernel 114 and other monitoring and sensing programs.

The root file system 120 is where all of the applications/services reside. For example, the root file system 120 includes files for executing a plurality of services, such as a thermal management service, a fan speed service, IPMI service, power capping service, media redirection service, etc. The root file system 120 includes applications for performing services, libraries associated with the applications, drivers, etc.

In implementations of the present subject matter, the non-volatile memory 110 of the BMC 102 is separated into a plurality of independently updatable RW partitions 122-1, 122-2, 122-3, . . . , 122-N. Each of the RW partitions 122-1, 122-2, 122-3, . . . , 122-N comprises a service module 124, and the service module 124 comprises one or more files related to a service that is provided by the BMC 102. The applications, libraries, and drivers of the root file system 120 may be categorized into different service modules 124 to allow independent updates of services according to the method of categorization. For example, each application of the BMC 102 may be separated into a different service module 124, the libraries associated with the applications may be separated into different service modules 124, and the drivers may be separated into different service modules 124. In another configuration, each application and its library/libraries may be stored in a separate service module 124, and the drivers may be separated into one or more service modules 124. In another example, applications that are commonly updated together may be separated into their own service module 124. Multiple configurations are possible, and the present disclosure is not limited to any particular configuration.

By separating the services into independently updatable different service modules 124 stored on RW partitions 122-1, 122-2, 122-3, . . . , 122-N, it is possible to update a single service of the BMC 102 without having to update all of the BMC's 102 services during the update process. Furthermore, it is possible to reset a single service to implement its update without having to update the entire BMC 102. Consider an example in which the BMC 102 reports a hardware error after diagnosing the hardware, and the error occurs because of the nature of the setup of the hardware rather than actual failure. For example, there is a bug in the hardware that causes the BMC 102 to see an error at a certain temperature rather than the actual temperature at which the error should be reported. When the BMC 102 is treated as a monolithic binary, the entire BMC 102 would need to be updated, which results in substantial unwanted downtime. By categorizing the services of the BMC 102 into different service modules and storing these service modules on separate RW partitions, the bug can be fixed by updating a single BMC service module rather than the entire BMC 102. Furthermore, update errors may be reduced because the update is focused only on a single service rather than on the entire BMC 102. Thus, one need not worry about an update error occurring in a service residing outside of the service module 124 that is being updated.

Although the RW partitions 122-1, 122-2, 122-3, . . . , 122-N are shown in FIG. 1 with respect to the root file system 120, the RW partitions 122-1, 122-2, 122-3, . . . , 122-N and service modules 124 contained therein are not limited to the root file system 120 of the BMC's 102 firmware. The RW partitions 122-1, 122-2, 122-3, . . . , 122-N and service modules 124 may also apply to other aspects of the BMC 102 firmware. For example, the configuration data 116 of the BMC's 102 firmware may also advantageously be its own service module 124 within an RW partition 122-N, or may be divided into multiple service modules/RW partitions. For example, if a feature is disabled in the configuration data 116, the configuration data 116 can be updated itself without having to update the entire BMC 102 by providing the configuration data 116 as its own RW partition 122-N.

The update agent 180 performs an update process for the service module 124 being updated. The update agent 180 may be machine readable code stored on the BMC 102. In implementations of the present disclosure, the update process may differ depending on whether the update is in-band or out-of-band. For the in-band update, the update package proceeds through the host computing device 160. For the out-of-band update, the update package proceeds through a secure out-of-band connection 140 that is not exposed to the host computing device 160.

For in-band communication, a BMC generally communicates with a host computing device using a protocol such as IPMI. However, such a protocol introduces protocol latency, as there is a certain amount of overhead added by the protocol. This is disadvantageous for updates, as the protocol latency increases the amount of time it takes to implement an update. Implementations of the present disclosure bypass this protocol overhead by taking advantage of the host computing device OS's native support for USB drives. In implementations of the present disclosure, the update agent 180 implements a special update mode process in which the BMC 102 enumerates a temporary update partition 132 onto the host computing device OS as a virtual memory drive 165, such as a virtual USB hard disk drive, thereby providing a high bandwidth protocol and a high bandwidth interface from the host computing device 160 to the BMC 102 to update BMC 102 services.

In the update process performed by the update agent 180, the update agent 180 may first receive a command from the update deployment agent 144 of the computing device 142 instructing the BMC 102 to enter into a special firmware update mode. When the update agent 180 receives the command, the update agent 180 mounts an update partition 132 of volatile memory 130 onto the host computing device 160 as a virtual memory drive 165. Mounting the update partition 132 of volatile memory 130 onto the host computing device may involve the BMC using its virtual memory service (e.g., an IPMI virtual memory service) to mount the update partition to the host computing device 160 as a USB key so that data may be directly written to the update partition 132. Once the update partition 132 is mounted onto the host computing device 160, the update deployment agent 144 may navigate to the virtual memory drive 165 and write an update package that comprises an update service module to the virtual memory drive 165. The BMC 102 thus receives the BMC update package and the update package is stored in the volatile memory 130 via the write operation performed by the update deployment agent 144.

Once the update deployment agent 144 has completed writing the update package to the virtual memory 165 device, the update deployment agent 144 may transmit a command to the update agent 180 to indicate completion of the write operation. Upon receipt of the command, the update agent 180 may then unmount the update partition 132 from the host computing device 160. The update agent may unmount the update partition 132 by, e.g., using its virtual memory service to unmount the update partition from the host computing device 160. The update agent 180 may then replace an existing service module in the corresponding RW partition 122-N of the non-volatile memory with the update service module included in the BMC update package.

In certain implementations of the present subject matter, the BMC update package received from the update deployment agent 144 may comprise a signed update service module. For example, the update deployment agent 144 may implement authentication techniques such as, for example, signature verification, key matching, and other such techniques. The authentication may aid in determining a valid update package and may thus protect the BMC 102 from security attacks. When such authentication techniques are used, the update agent 180 may authenticate the update package written to the update partition 132 of the volatile memory 130 prior to replacing the corresponding existing service module in the non-volatile memory 110 with the update service module.

In certain implementations of the present disclosure, the update agent 180 may include a timer 182. The timer 182 may determine whether the time taken to write the update package to the update partition 132 exceeds a predetermined time. If the time taken exceeds the predetermined time, the update agent 180 may unmount the update partition 132 from the host computing device 160 and discard the update package for security purposes. For example, in the case of a compromised host computing device 160, a bad actor may try to install malware of a large size. Implementing a timer 182 prevents such malware from being installed on the non-volatile memory 110 of the BMC 102. In addition to, or instead of, timer 182, the update agent 180 may also implement a size restriction on the size of any file being written to the BMC 102 by way of the virtual memory drive 165.

Different from the in-band update process performed by the update agent 180, for an out-of-band update, the update package proceeds through a secure out-of-band connection 140 that is not exposed to the host computing device 160. In such a situation, the update deployment agent 144 may write the update package directly to the update partition 132. In order to write the package directly to the update partition 132, secure file transfer protocol (SFTP) may be implemented and used to transfer the update package to the update partition 132. Once the update deployment agent 144 has completed the write process, the update deployment agent 144 may send a command to the update agent 180 indicating completion of the write process.

Similar to the in-band update process, in the out-of-band process the update deployment agent 144 may implement an authentication technique on the update package written to the update partition 132. In this case, the update agent 180 may authenticate the update package written to the update partition 132 prior to replacing the corresponding existing service module in the non-volatile memory 110 with the update service module.

In implementations of the present subject matter, during the update processes described above, the existing service module may run from the volatile memory 130 while the update process is being performed. For example, when a service associated with a service module 124 is to be performed by the BMC 102, the service module 124 may be transferred from its RW partition 122-N in the non-volatile memory 110 to a portion of the volatile memory 130 other than the update partition 132. The service module 124 may thus be executed from the volatile memory 130 while the update process is being performed.

Figure 2:
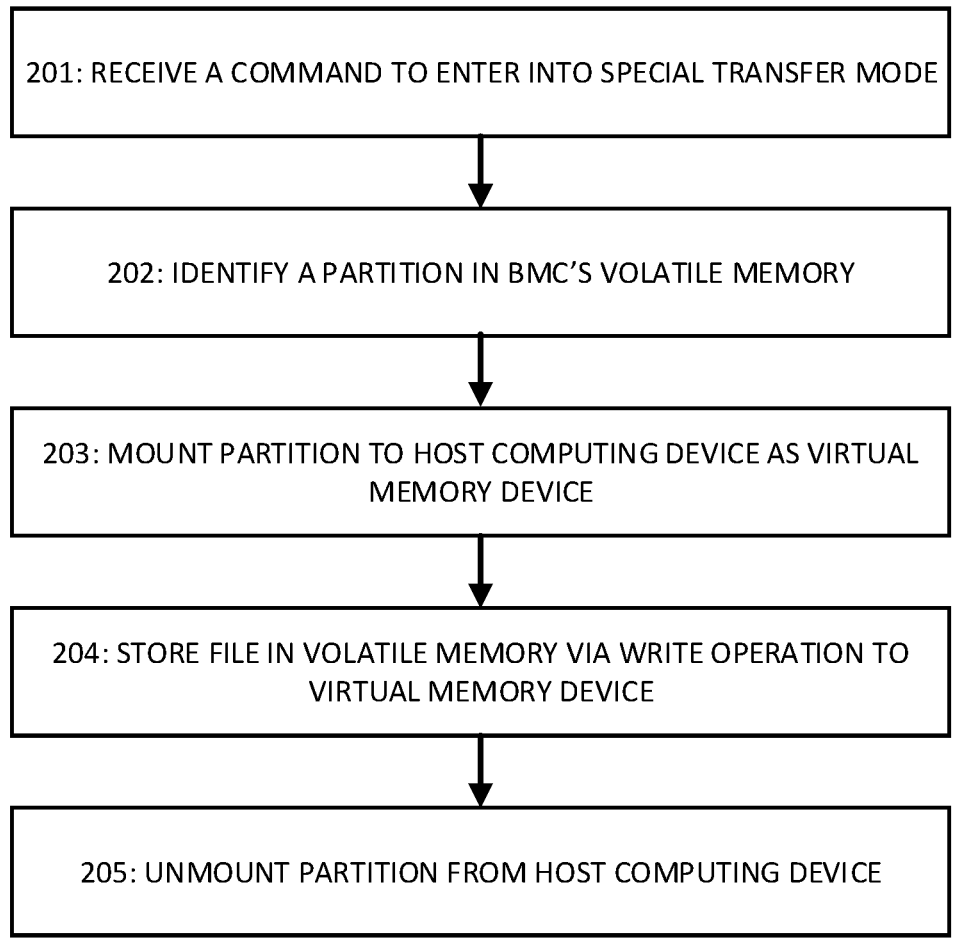
FIG. 2 illustrates a flowchart depicting a method for transferring data from a host computing device to a BMC, in accordance with an example implementation of the present disclosure.

FIG. 2 illustrates a flowchart depicting a method for transferring data from a host computing device 160 to a BMC 102, in accordance with an example implementation of the present disclosure.

Referring to FIG. 2, at block 201, the BMC 102 receives a command to enter into a special transfer mode so that data may be transferred to the BMC 102. The command may, for example, be sent by a deployment agent 144 of a remote computing device, such as computing device 142, or by the host computing device 160. The command may, for example, be sent to the BMC 102 using the IPMI protocol for in-band or the redfish protocol for out-of-band.

In general, data is transferred between the host computing device 160 and the BMC 102, or between computing device 142 and the BMC 102 using protocols such as IPMI for in-band communication or Redfish for out-of-band communication. Data transfer using these protocols has a certain amount of protocol overhead, which increases the time it takes to transfer the data. The special transfer mode is a mode in which the computer system 100 takes advantage of the native speed of a host computing device's 160 memory drive to transfer data between the host computing device 160 and the BMC 102. For example, the host computing device 160 has the capability to mount a remote drive as a USB hard disk drive, and the BMC 102 may control this mounting operation. In the special transfer mode, the BMC 102 mounts its own volatile memory 130 to the host computing device 160, thus facilitating the transfer of data between the host computing device 160 and BMC 102.

In implementations of the present subject matter, the command to enter into a special transfer mode received by the BMC 102 may include information in addition to an indication that the BMC 102 should mount a partition of its volatile memory 130 onto the host computing device 160. For example, the command may also include the size of the file that is to be written to the volatile memory 130, so that the BMC 102 can allocate the proper amount of volatile memory to be mounted to the host computing device 160.

At block 202, the BMC 102 identifies a partition 132 in the BMC's 102 volatile memory 130 to mount to the host computing device 160 as a virtual memory drive 165. In implementations of the present subject matter, the partition 132 may be reserved in advance for the data transfer mode, or the partition 132 may be a dynamically allocated memory partition. At block 203, the BMC 102 mounts this partition 132 onto the host computing device 160 as a virtual memory drive 165 (e.g., a virtual USB hard disk drive).

At block 204, data is stored in the volatile memory 130 of the BMC 102 by way of a write operation to the virtual memory drive 165. For example, the virtual memory drive 165 may appear as a USB hard disk drive to the remote computing device 142 and/or the host computing device 160. In order to transfer data to the BMC 102, the host computing device 160 or the remote computing device 142 may write data to the virtual memory drive 165, which in turn stores the data on the BMC's volatile memory 130.

Once the write operation is completed, at block 205, the BMC 102 unmounts the partition 132 from the host computing device 160. In certain implementations of the present subject matter, the BMC 102 may receive a command from the host computing device 160 or the remote computing device 142 signaling that the write operation is complete and that the BMC 102 may unmount the virtual memory drive 165.

In implementations of the present subject matter, the data transfer method described with reference to FIG. 2 can be useful in a variety of cases. For example, the data transfer mode may be useful in transferring telemetry data from the host computing device 160 to the BMC 102. Furthermore, the data transfer mode may be useful in updating the firmware of the BMC 102, an implementation of which will be described with reference to FIG. 3.

Figure 3:
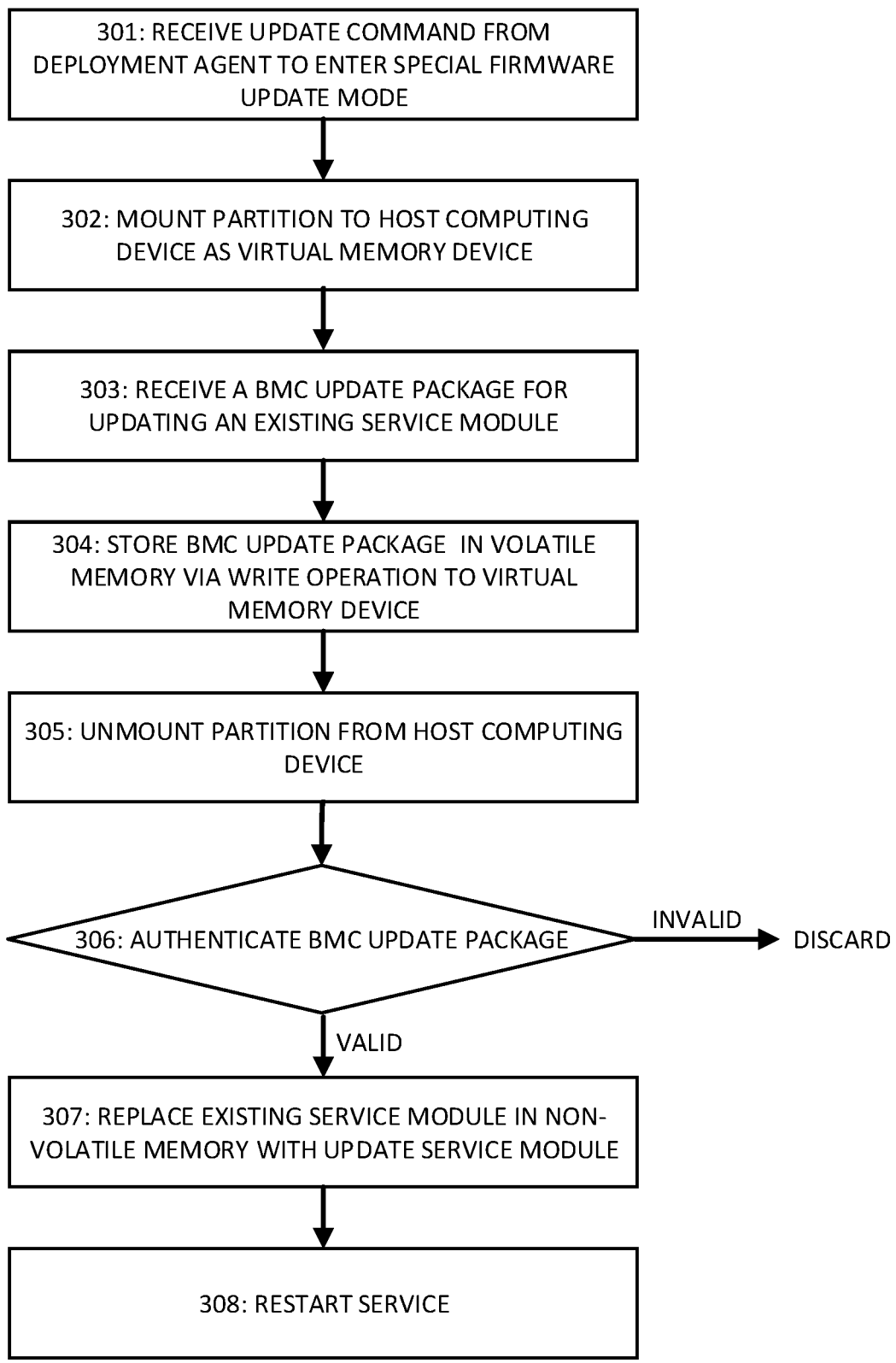
FIG. 3 illustrates a flowchart depicting a method for updating a firmware of a BMC, in accordance with an example implementation of the present disclosure.

FIG. 3 illustrates a flowchart depicting a method for updating firmware of a BMC, in accordance with an example implementation of the present disclosure. The process illustrated with reference to FIG. 3 may be referred to as an in-bound process, as data is transferred through the host computing device 160.

Referring to FIG. 3, at block 301 the BMC 102 receives an update command from the update deployment agent 144 of computing device 142 instructing the BMC 102 to enter into a special firmware update mode. The command may, for example, be sent to the BMC 102 using the IPMI protocol for in-band, the redfish protocol for out-of-band, or other applicable protocols. In implementations of the present subject matter, the special update mode is a mode in which the BMC 102 mounts a partition of its volatile memory 130 onto the host computing device 160 as a virtual memory drive 165.

In certain implementations of the present subject matter, the command to enter into a special update mode received by the BMC 102 may include information in addition to an indication that the BMC 102 should mount a partition of its volatile memory 130 onto the host computing device 160. For example, the command may also include the size of the update package that is to be written to the volatile memory 130, so that the BMC 102 can allocate the proper amount of volatile memory to be mounted to the host computing device 160.

At block 302, the BMC 102 mounts an update partition 132 of its volatile memory 130 to the host computing device 160 as a virtual memory drive 165. The virtual memory drive 165 may appear to the computing device 142 as a virtual USB hard disc drive.

In certain implementations of the present subject matter, when mounting the update partition 132 onto the host computing device 160, the BMC 102 may assign the virtual memory drive 165 an identifier that is the same as the BMC's global unique identifier (GUID). The use of the GUID provides an additional layer of security to the update process. In such an implementation, the host computing device 160 may obtain the BMC's GUID prior to any mounting operation by way of the IPMI protocol. Thus, the host computing device 160 can match the GUID obtained by way of the IPMI protocol with the identifier of the virtual memory drive 165 to ensure that the virtual memory drive 165 is authentic.

At block 303, the BMC 102 receives a BMC update package for updating an existing service module from the update deployment agent 144. The BMC update package may include an update service module for replacing the existing service module. The BMC update package may be received through a high bandwidth protocol and high bandwidth channel, because the operation of mounting the update partition 132 to the host computing device 160 eliminates protocol overhead and instead utilizes the native speed of the host computing device's 160 memory drive.

In certain implementations of the present subject matter, the BMC package received from the update deployment agent 144 may include an update service module on which an authentication technique is employed. For example, the update deployment agent 144 may implement authentication techniques such as signature verification, key matching, and other such techniques. The authentication may aid in determining a valid update package and may thus protect the BMC 102 from security attacks.

At block 304, the BMC update package is stored in the update partition 132 of the BMC's volatile memory 130.

Receiving the update package and storing the update package in the update partition 132 may be accomplished by way of a write operation to the virtual memory drive 165. For example, the update deployment agent 144 of the computing device 142 may have the BMC's GUID in advance of sending the update package. The GUID may, for example, be obtained by the update deployment agent 144 through the IPMI protocol in the case of in-band transmission and through the redfish protocol in the case of out-of-band transmission. The update deployment agent 144 may thus navigate to the virtual memory drive 165 having the same identifier as the BMC's 102 GUID. The update deployment agent 144 may then write the update package to the virtual memory drive 165, which in turn transmits and stores the update package in the update partition 132 of the volatile memory 130.

At block 305, once the BMC update package is stored in the update partition 132 of the volatile memory 130, the BMC 102 may unmount the update partition 132 from the host computing device 160. In certain implementations of the present subject matter, the BMC 102 may unmount the update partition 132 in response to a command from the update deployment agent 144. For example, the update deployment agent 144 may send a control packet through the in-band or out-of-band channel indicating that its write operation is complete, which in turn signals that the BMC 102 should unmount its update partition 132 from the host computing device 160.

When the BMC update package received from the update deployment agent 144 is a BMC update package on which an authentication technique is employed, at block 306, the BMC update package is authenticated prior to replacing the existing update service module with the update service module. The authentication may ensure that the update package is valid and may thus protect the BMC 102 from security attacks. To do so, the BMC 102 may employ various authentication techniques such as, for example, a public-private key pair to verify the authenticity of the update package. If the BMC 102 determines that the BMC update package is a valid package, the process proceeds to block 307. If the BMC 102 determines that the BMC update package is invalid, the BMC update package is discarded.

At block 307, the BMC 102 replaces an existing service module in the corresponding RW partition 122-N of the non-volatile memory 110 with the update service module included in the firmware update package.

In certain implementations, the RW partition 122-N that includes the existing service module may be one of a plurality of independently updateable RW partitions. That is, the non-volatile memory 110 of the BMC 102 may be separated into a plurality of independently updatable RW partitions 122-1, 122-2, 122-3, . . . , 122-N. Each of the RW partitions 122-1, 122-2, 122-3, . . . , 122-N comprises a service module 124, and the service module 124 is one or more files related to a service that is provided by the BMC 102. For example, the applications, libraries, and drivers of the root file system 120 may be categorized into different service modules 124 to allow independent updates of services according to the method of categorization.

In certain implementations, the service associated with the existing service module 124 may be running in the BMC 102 while the existing service module 124 is being updated. For example, the existing service module 124 may be loaded into a portion of the volatile memory 130 other than the update partition 132, and the processor 104 may execute the service module 124 from the volatile memory 130 during the update process to perform the service. Thus, there is no interruption to the current service while the update is going on in the background.

At block 308 the BMC 102 restarts the service associated with the updated service module, thereby executing the new application and/or libraries or drivers included in the updated service module. At this time, only the updated service is restarted, and all other services remain unaffected.

Figure 4:
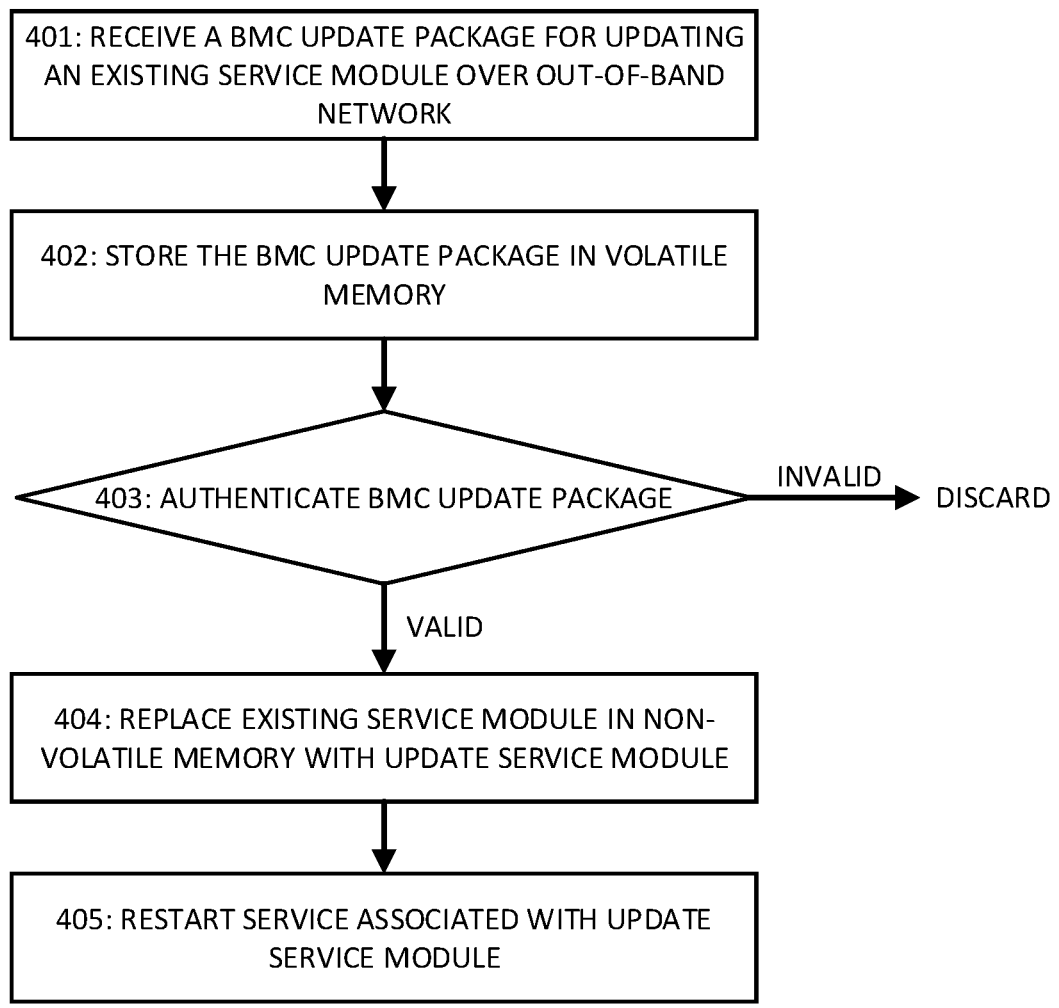
FIG. 4 illustrates a flowchart depicting a method for updating a firmware of a BMC, in accordance with an example implementation of the present disclosure.

FIG. 4 illustrates a flowchart depicting a method for updating firmware of a BMC 102, in accordance with an example implementation of the present disclosure. The flowchart illustrated in FIG. 4 shows an out-of-band method of updating the BMC firmware.

At block 401, the BMC 102 receives a BMC update package for updating an existing service module from the update deployment agent 144. For the out-of-band process, the BMC 102 receives the BMC update package by enabling SFTP. In this case, the update deployment agent 144 connects to the BMC 102 using SFTP, which initiates a connection to the BMC's 102 volatile memory 130.

Similar to the in-bound process, in certain implementations of the present subject matter, the BMC update package received from the update deployment agent 144 may comprise an update service module on which an authentication technique is employed. For example, the update deployment agent 144 may implement authentication techniques such as, for example, signature verification, key matching, and other such techniques.

At block 402, the BMC update package is stored in the update partition 132 of the volatile memory 130 of the BMC 102. The BMC update package may be stored in the update partition 132 by way of a write operation performed by the update deployment agent 144 to the update partition 132 of the volatile memory 130.

When the BMC update package received from the update deployment agent 144 is a BMC update package on which an authentication technique has been employed, at block 403, the BMC update package is authenticated prior to replacing the existing update service module with the update service module. The authentication may ensure that the update package is valid and may thus protect the BMC 102 from security attacks. Similar to the in-bound process, the BMC 102 may employ various authentication techniques such as, for example, a public-private key pair to verify the authenticity of the update package. If the BMC 102 determines that the BMC update package is a valid package, the process proceeds to block 404. If the BMC 102 determines that the BMC update package is invalid, the BMC update package is discarded.

At block 404, the BMC 102 replaces an existing service module stored in a RW partition 122-N of the non-volatile memory 110 with an update service module included in the BMC update package. Similar to the in-bound process, in certain implementations, the RW partition 122-N that comprises the existing service module may be one of a plurality of independently updateable RW partitions 122-1, 122-2, 122-3, . . . , 122-N each having a service module 124 stored therein.

At block 405, the BMC 102 restarts the service associated with the updated service module, thereby executing the new application and/or libraries or drivers included in the updated service module. At this time, only the updated service is restarted, and all other services remain unaffected.

Similar to the in-bound process, in certain implementations, the service associated with the existing service module may be running in the BMC 102 while the existing service module is being updated.

Figure 5:
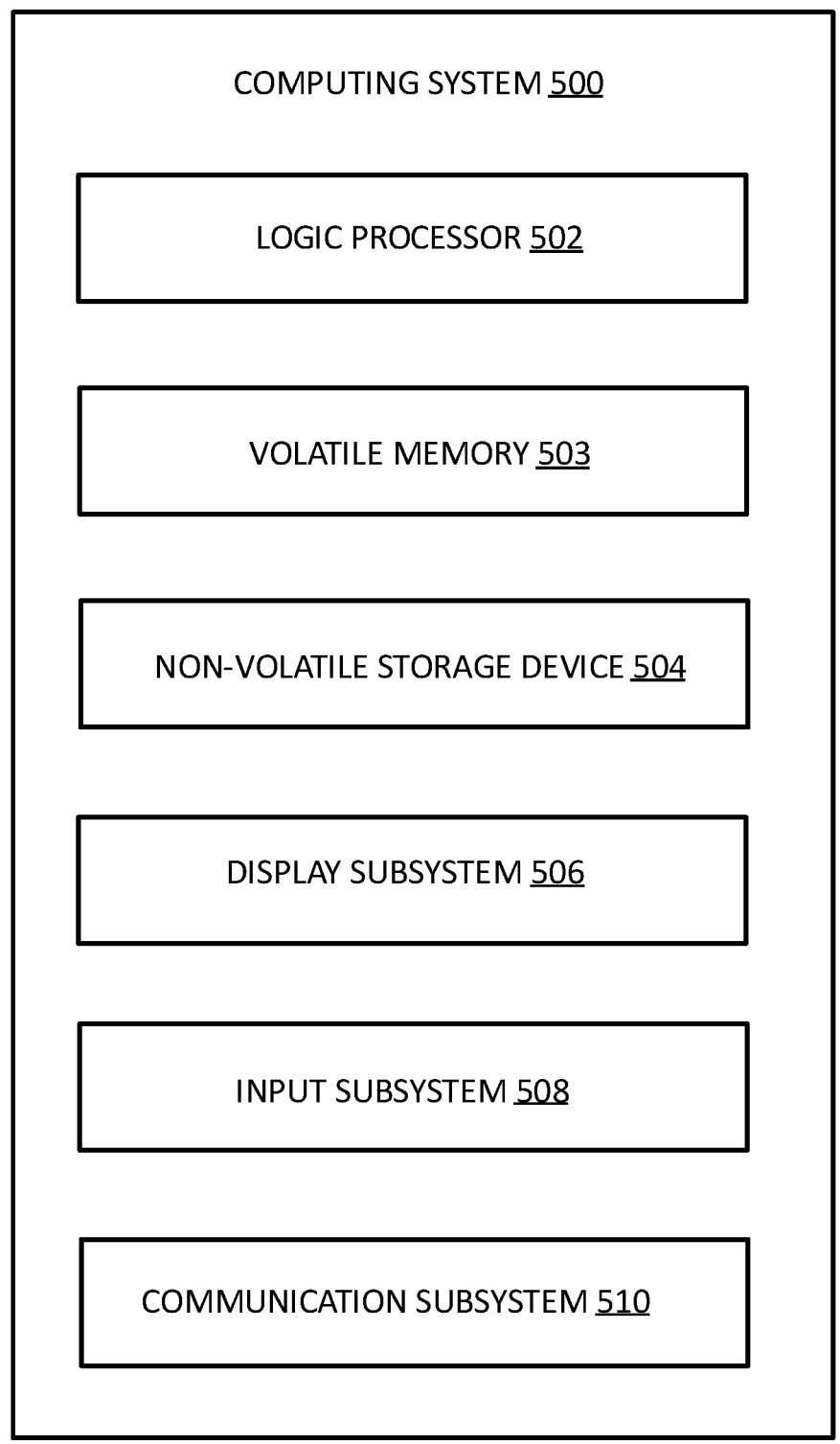
FIG. 5 shows an example computing system suitable for implementing one or more implementations of the subject matter described herein.

FIG. 5 schematically shows a non-limiting embodiment of a computing system 500 that can enact one or more of the methods and processes described above. Computing system 500 is shown in simplified form. Computing system 500 may embody the BMC 102 or the computer system 100 of FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 503, and a non-volatile storage device 504. Computing system 500 may optionally include a display subsystem 506, input subsystem 508, communication subsystem 510, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. Logic processor may, for example, embody the BMC processor 104 of FIG. 1.

The logic processor 502 may include one or more physical processors (hardware) configured to execute software instructions. Additionally or alternatively, the logic processor 502 may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 504 includes one or more physical devices configured to hold instructions executable by the logic processors to implement the methods and processes described herein. When such methods and processes are implemented, the state of non-volatile storage device 504 may be transformed—e.g., to hold different data. Non-volatile storage device 504 may, for example, embody the non-volatile memory 110 shown in FIG. 1.

Non-volatile storage device 504 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 504 may include nonvolatile, dynamic, static, read/write, read-only, sequential-access, location-addressable, file-addressable, and/or content-addressable devices. It will be appreciated that non-volatile storage device 504 is configured to hold instructions even when power is cut to the non-volatile storage device 504.

Volatile memory 503 may include physical devices that include random access memory. Volatile memory 503 is typically utilized by logic processor 502 to temporarily store information during processing of software instructions. It will be appreciated that volatile memory 503 typically does not continue to store instructions when power is cut to the volatile memory 503. Volatile memory 504 may, for example, embody the volatile memory 130 depicted in FIG. 1.

Aspects of logic processor 502, volatile memory 503, and non-volatile storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "mechanism," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 504, using portions of volatile memory 503. It will be understood that different modules, programs, mechanisms and/or engines may be instantiated from the same application, service, code block, object, library, routine, API, function, etc. Likewise, the same module, program, mechanism and/or engine may be instantiated by different applications, services, code blocks, objects, routines, APIs, functions, etc. The terms "module," "program," "mechanism" and "engine" may encompass individual or groups of executable files, data files, libraries, drivers, scripts, database records, etc.

When included, display subsystem 506 may be used to present a visual representation of data held by non-volatile storage device 504. The visual representation may take the form of a graphical user interface (GUI). As the herein described methods and processes change the data held by the non-volatile storage device, and thus transform the state of the non-volatile storage device, the state of display subsystem 506 may likewise be transformed to visually represent changes in the underlying data. Display subsystem 506 may include one or more display devices utilizing virtually any type of technology. Such display devices may be combined with logic processor 502, volatile memory 503, and/or non-volatile storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 510 may be configured to communicatively couple various computing devices described herein with each other, and with other devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "includes," "has," "comprising," "including" and/or "having," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. This description has been presented for purposes of illustration and description, but is not intended to be exhaustive or limiting in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

Although specific embodiments have been described, it will be understood by those of skill in the art that there are other embodiments that are equivalent to the described embodiments. Accordingly, it is to be understood that the present disclosure is not to be limited by the specific illustrated embodiments, but only by the scope of the appended claims.

According to one aspect of the present disclosure, a system comprises a BMC comprising a process and a memory. The memory may include a non-volatile memory and a volatile memory. The non-volatile memory may comprise firmware categorized into a plurality of independently updatable service modules, each of the independently updatable storage modules being stored on a read-write (RW) partition of the non-volatile memory. Each independently updatable service module may comprise at least one of an application, a library, and a driver. The memory may further comprise executable code that, when executed at the processor, is configured to perform a firmware update. The firmware update may include: receive a BMC update package for updating an existing service module stored in one of the plurality of RW partitions, where the BMC update package comprises an update service module; store the BMC update package in the volatile memory; and replace the existing service module stored in the RW partition of the non-volatile memory with the update service module.

In this aspect, the existing service module may be running from the volatile memory while the firmware update is being performed.

In this aspect, the BMC update package may comprise a signed update service module, and after storing the BMC update package in the volatile memory and before replacing the existing service module stored in the RW partition of the non-volatile memory with the update service module, the firmware update may further comprise: authenticate the BMC update package.

In this aspect, the BMC may be connected to a host computing device through a memory interface, and the firmware update may further comprise: prior to receiving the BMC update, receive an update command from an update deployment agent instructing the BMC to enter firmware update mode; and mount a partition of the volatile memory onto the host computing device as a virtual memory drive, wherein the BMC update package is stored in the volatile memory by way of a write operation to the virtual memory drive.

In this aspect, the memory bus may comprise a Universal Serial Bus (USB), and the virtual memory drive may comprise a virtual USB hard disk drive.

In this aspect, the firmware update may further comprise: determine whether a time taken to write the BMC update package to the volatile memory exceeds a predetermined time; when the time taken to write the BMC exceeds the predetermined time, unmount the partition of the volatile memory and discard the BMC update package.

In this aspect, the firmware update may further comprise: receive, from the update deployment agent, a command indicating completion of the write operation; and unmount the partition of the volatile memory from the host computing device.

In this aspect, the BMC may be connected to an update deployment agent through an out-of-band interface.

In this aspect, the out-of-band interface may be a Local Area Network (LAN) interface.

In this aspect, the BMC may receive the update package through secure file transfer protocol (SFTP).

According to another aspect of the present disclosure, a method of updating firmware of a baseboard management controller (BMC) may comprise: receiving a BMC update package comprising an update service module for updating an existing service module of the BMC, the existing service module being stored in one of a plurality of read-write (RW) partitions of a non-volatile memory of the BMC, each RW partition comprising an independently updatable service module, wherein each independently updatable service module comprises at least one of an application, a library, and a driver; storing the BMC update package in a volatile memory of the BMC; replacing the existing service module stored in the RW partition of the non-volatile memory with the update service module; and restarting a service of the BMC associated with the update service module.

In this aspect, the BMC update package may comprise a signed update service module, and the method may further comprise authenticating the signed update service module after storing the BMC update package in the volatile memory of the BMC.

In this aspect, the method may further comprise: prior to receiving the BMC update package, receiving an update command from an update deployment agent instructing the BMC to enter firmware update mode; mounting a partition of the volatile memory onto a host computing device connected to the BMC through a memory interface as a virtual memory drive; wherein the BMC update package is stored in the volatile memory by way of a write operation to the virtual memory drive.

In this aspect, the memory interface may comprise a Universal Serial Bus (USB), and the virtual memory drive may comprise a virtual USB hard disk drive.

In this aspect, the method may further comprise: receiving, from the update deployment agent, a command indicating completion of the write operation; and unmounting the partition of the volatile memory from the host computing device.

In this aspect, the BMC may be connected to an update deployment agent through an out-of-band interface.

In this aspect, the out-of-band interface may be a Local Area Network (LAN) interface.

In this aspect, the BMC may receive the update package through secure file transfer protocol (SFTP).

In another aspect of the present disclosure, a method for transferring files to a baseboard management controller (BMC) may comprise: receiving a command from a deployment agent instructing the BMC to enter into transfer mode; identifying a partition of volatile memory of the BMC and mounting the partition of the volatile memory to a host computing device connected to the BMC through a memory interface as a virtual memory drive; transferring a file from a host computing device to the BMC by storing the file in the volatile memory by way of a write operation to the virtual memory drive; and unmounting the partition of the volatile memory from the host computing device.

In this aspect, the memory bus may comprise a Universal Serial Bus (USB), and the virtual memory drive may comprise a virtual USB hard disk drive.

The invention claimed is:

1. A system, comprising: a baseboard management controller (BMC), comprising: a processor and memory comprising a non-volatile memory and a volatile memory, the non-volatile memory comprising firmware categorized into a plurality of independently updatable service modules, each of the independently updatable service modules being stored on a read-write (RW) partition of the non-volatile memory, wherein each independently updatable service module comprises at least one of an application, a library, and a driver, the memory further comprising executable code that, when executed at the processor, is configured to: perform a firmware update comprising: receive a BMC update package for updating an existing service module stored in one of a plurality of RW partitions, the BMC update package comprising an update service module; store the BMC update package in the volatile memory; replace the existing service module stored in the RW partition of the non-volatile memory with the update service module without replacing at least one other service module stored in at least one other RW partition of the non-volatile memory; and restart a service of the BMC associated with the update service module without affecting other service modules stored in other RW partitions of the non-volatile memory.

2. The system of claim 1, wherein the existing service module is running from the volatile memory while the firmware update is being performed.

3. The system of claim 1, wherein the BMC update package comprises a signed update service module, and after storing the BMC update package in the volatile memory and before replacing the existing service module stored in the RW partition of the non-volatile memory with the update service module, and wherein performing the firmware update further comprises authenticate the BMC update package.

4. The system of claim 1, wherein the BMC is connected to a host computing device through a memory interface, and wherein performing the firmware update further comprises:
prior to receiving the BMC update, receive an update command from an update deployment agent instructing the BMC to enter firmware update mode; and
mount a partition of the volatile memory onto the host computing device as a virtual memory drive,
wherein the BMC update package is stored in the volatile memory by way of a write operation to the virtual memory drive.

5. The system of claim 4, wherein the memory interface comprises a Universal Serial Bus (USB), and the virtual memory drive comprises a virtual USB hard disk drive.

6. The system of claim 4, wherein perform the firmware update further comprises:
determine whether a time taken to write the BMC update package to the volatile memory exceeds a predetermined time; and
when the time taken to write the BMC exceeds the predetermined time, unmount the partition of the volatile memory and discard the BMC update package.

7. The system of claim 4, wherein perform the firmware update further comprises:
receive, from the update deployment agent, a command indicating completion of the write operation; and
unmount the partition of the volatile memory from the host computing device.

8. The system of claim 1, wherein the BMC is connected to an update deployment agent through an out-of-band interface.

9. The system of claim 8, wherein the BMC receives the BMC update package through secure file transfer protocol (SFTP).

10. A method of updating firmware of a baseboard management controller (BMC), comprising:
receiving a BMC update package comprising an update service module for updating an existing service module of the BMC, the existing service module being stored in one of a plurality of read-write (RW) partitions of a non-volatile memory of the BMC, each RW partition comprising an independently updatable service module, wherein each independently updatable service module comprises at least one of an application, a library, and a driver;
storing the BMC update package in a volatile memory of the BMC;
replacing the existing service module stored in the RW partition of the non-volatile memory with the update service module without replacing at least one other service module stored in at least one other RW partition of the non-volatile memory; and
restarting a service of the BMC associated with the update service module without affecting other service modules stored in other RW partitions of the non-volatile memory.

11. The method of claim 10, wherein the BMC update package comprises a signed update service module, and the method further comprises authenticating the signed update service module after storing the BMC update package in the volatile memory of the BMC.

12. The method of claim 10, further comprising:
prior to receiving the BMC update package, receiving an update command from an update deployment agent instructing the BMC to enter firmware update mode; and
mounting a partition of the volatile memory onto a host computing device connected to the BMC through a memory interface as a virtual memory drive;
wherein the BMC update package is stored in the volatile memory by way of a write operation to the virtual memory drive.

13. The method of claim 12, wherein the memory interface comprises a Universal Serial Bus (USB), and the virtual memory drive comprises a virtual USB hard disk drive.

14. The method of claim 12, further comprising:
receiving, from the update deployment agent, a command indicating completion of the write operation; and
unmounting the partition of the volatile memory from the host computing device.

15. The method of claim 10, wherein the BMC is connected to an update deployment agent through an out-of-band interface.

16. The method of claim 15, wherein the out-of-band interface is a Local Area Network (LAN) interface.

17. The method of claim 10, wherein the BMC receives the BMC update package through secure file transfer protocol (SFTP).

18. A baseboard management controller (BMC), comprising:
one or more processors;
volatile memory;
non-volatile memory comprising a plurality of read-write (RW) partitions;
firmware stored in the non-volatile memory;
a plurality of independently updatable service modules in the firmware, each of the plurality of independently updatable service modules being stored on one of the plurality of RW partitions of the non-volatile memory, each of the plurality of independently updatable service modules comprising at least one of an application, a library, and a driver; and
instructions in the firmware that are executable by the one or more processors to:
receive a BMC update package that is configured to update an existing service module stored in one of the plurality of RW partitions, the BMC update package comprising an update service module;

replace an existing service module stored in a RW partition of the non-volatile memory with the update service module without replacing a plurality of other service modules stored in a plurality of other RW partitions of the non-volatile memory; and
restart a service of the BMC associated with the update service module without restarting the plurality of other service modules stored in the plurality of other RW partitions of the non-volatile memory.

\* \* \* \* \*